(12) United States Patent
Uchiyama (10) Patent No.: US 6,795,165 B2
(45) Date of Patent: Sep. 21, 2004

(54) FOCUS INSPECTION DEVICE AND FOCUSING METHOD

(75) Inventor: Kaoru Uchiyama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 114 days.

(21) Appl. No.: 10/098,122

(22) Filed: Mar. 15, 2002

(65) Prior Publication Data

US 2002/0131029 A1 Sep. 19, 2002

(30) Foreign Application Priority Data

Mar. 16, 2001 (JP) ........................................ 2001-076711

(51) Int. Cl.⁷ ........................ G03B 27/52; G03B 27/34; G03B 27/36
(52) U.S. Cl. ............................ 355/55; 355/56; 355/59; 355/61
(58) Field of Search ............................ 355/61, 40, 55, 355/56, 59, 62, 63

(56) References Cited

U.S. PATENT DOCUMENTS 4,645,338 A * 2/1987 Juliana et al. .............. 356/150
4,876,568 A    10/1989 Ozawa et al.
5,898,479 A * 4/1999 Hubbard et al. .............. 355/61

FOREIGN PATENT DOCUMENTS

JP    1-200344    8/1989

OTHER PUBLICATIONS

Abstract JP 64–017013.

* cited by examiner

Primary Examiner—Rodney Fuller
(74) Attorney, Agent, or Firm—Sughrue Mion, PLLC (57) ABSTRACT

A photographic lens and test chart provide for a method of inspecting and adjusting the focus of the lens. The test chart is obliquely inclined relative to a plane perpendicular to the viewing axis of the photographic lens. Test photographs are taken of the test chart under low magnification and high magnifications the test photographs enabling the photographic lens to be adjusted for proper focus.

21 Claims, 10 Drawing Sheets

FOCUS INSPECTION DEVICE AND FOCUSING METHOD

BACKGROUND OF THE INVENTION

1. Field of the Invention

The present invention relates to a focus inspection device and a focusing method using the focus inspection device, especially to those applied to a printing lens that is used for projecting an optical image of an original, like a picture frame on a photographic film or a photo-print onto a photosensitive recording material, like photographic paper.

2. Background Arts

As a method of adjusting the focus of the printing lens in photographic printers, it has been widely conducted making a test print from a test original that is photographed on a photographic film and contains an ordinary image, like a grayscale image of a landscape, and inspecting the test print with naked eyes. In that case, it is usual to make a plurality of test prints from the same original while shifting the focus of the printing lens step by step, and compare the test prints to each other for determining the optimum focal position. Which is called a round exposure method, and is disclosed for example in JPA Nos. 64-17013 and 01-200344.

According to this conventional method, however, the inspector cannot exactly determine the optimum focal position because it is not easy to judge the sharpness of the test print containing the ordinary image. Particularly when the test prints are made at a low print magnification, that is, when the printing lens is set at a low magnification and thus has a large depth of field, it is still more difficult to judge from the test print as to whether a reference focal plane, in which the test original and other originals to print are positioned, coincides with the center of the depth of field, i.e. the focal plane of the printing lens in the object side. If the reference focal plane does not coincides with the center of the depth of field of the printing lens, and the original is not held flat in the reference focal plane, the printed image can be blurred.

SUMMARY OF THE INVENTION

In view of the foregoing, an object of the present invention is to provide a focus inspection device for use in focusing an image forming lens, that facilitates to inspecting focal conditions of the image forming lens.

Another object of the present invention is to provide a focus inspection device that permits quantitative determination of a deviation of a focal plane of an image forming lens from a reference focal plane.

A further object of the present invention is to provide a focusing method for a printing lens, using such a focus inspection device.

According to the present invention, a focus inspection device for a lens that is determined to form an optical image of an original on a predetermined image forming surface when the original is placed in a predetermined reference focal plane that is perpendicular to an optical axis of the lens, comprises a focusing chart having a test pattern thereon; and a holding device for holding the focusing chart in a position inclined to the reference focal plane, wherein a deviation of an object focal plane of the lens from the reference focal plane is detected in view of sharpness of the test pattern on an image formed from the focusing chart through the lens.

The holding device preferably holds the focusing chart such that a center of the test pattern is aligned with the reference focal plane.

According to a preferred embodiment, the focusing chart further comprises a scale provided adjacent the test pattern along the inclined direction of the focusing chart, the scale serving as a measure of relative height of the inclined focusing chart to the reference focal plane.

The sharpness of the test pattern may be evaluated as density distribution on the test print, to detect the deviation value of the object focal plane of the printing lens as a deviation value of the lowest density area from the center of the test pattern on the test print.

The test pattern preferably comprises a plurality of lines extending in parallel to a transverse direction to the inclined direction of the focusing chart, the lines being equally spaced from each other in the inclined direction.

According to a more preferred embodiment, the test pattern comprises a plurality of rows of lines extending in parallel to a transverse direction to the inclined direction of the focusing chart, the lines being equally spaced from each other in the inclined direction within each row, and the spacing between the lines increases sequentially from one row to another.

Since the narrower spacing between the lines on the focusing chart results the narrower lowest density area on the test print, the lowest density area appearing on the reproduced test pattern consisting of the plurality of rows of lines with gradually increased line densities displays a substantially triangular shape. Therefore, it becomes possible to determine the deviation of the lowest density area from the center of the test pattern as a definite quantitative value.

According to another aspect of the present invention, a focusing method for a printing lens that is determined to print an image of an original on a photosensitive recording material placed in a predetermined position when the original is placed in a predetermined reference focal plane that is perpendicular to an optical axis of the lens, the method comprising the steps of: holding a focusing chart with a test pattern thereon in a position where the focusing chart is inclined to the reference focal plane with a center of the test pattern aligned with the reference focal plane; making at least a test print from the focusing chart through the printing lens; detecting a deviation value of an object focal plane of the printing lens from the reference focal plane in view of sharpness of the test pattern reproduced on the test print; and adjusting the object focal plane of the printing lens to the reference focal plane in accordance with the detected deviation value of the object focal plane.

It is preferable to make test prints from the focusing chart through the printing lens while setting the printing lens at different printing magnifications, detect a deviation value of an object focal plane of the printing lens from the reference focal plane at each of the different printing magnifications in view of sharpness of the test pattern reproduced on the test prints, and calculate correction amounts from the deviation values detected from the test prints, for focusing the printing lens in accordance with the correction amount.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
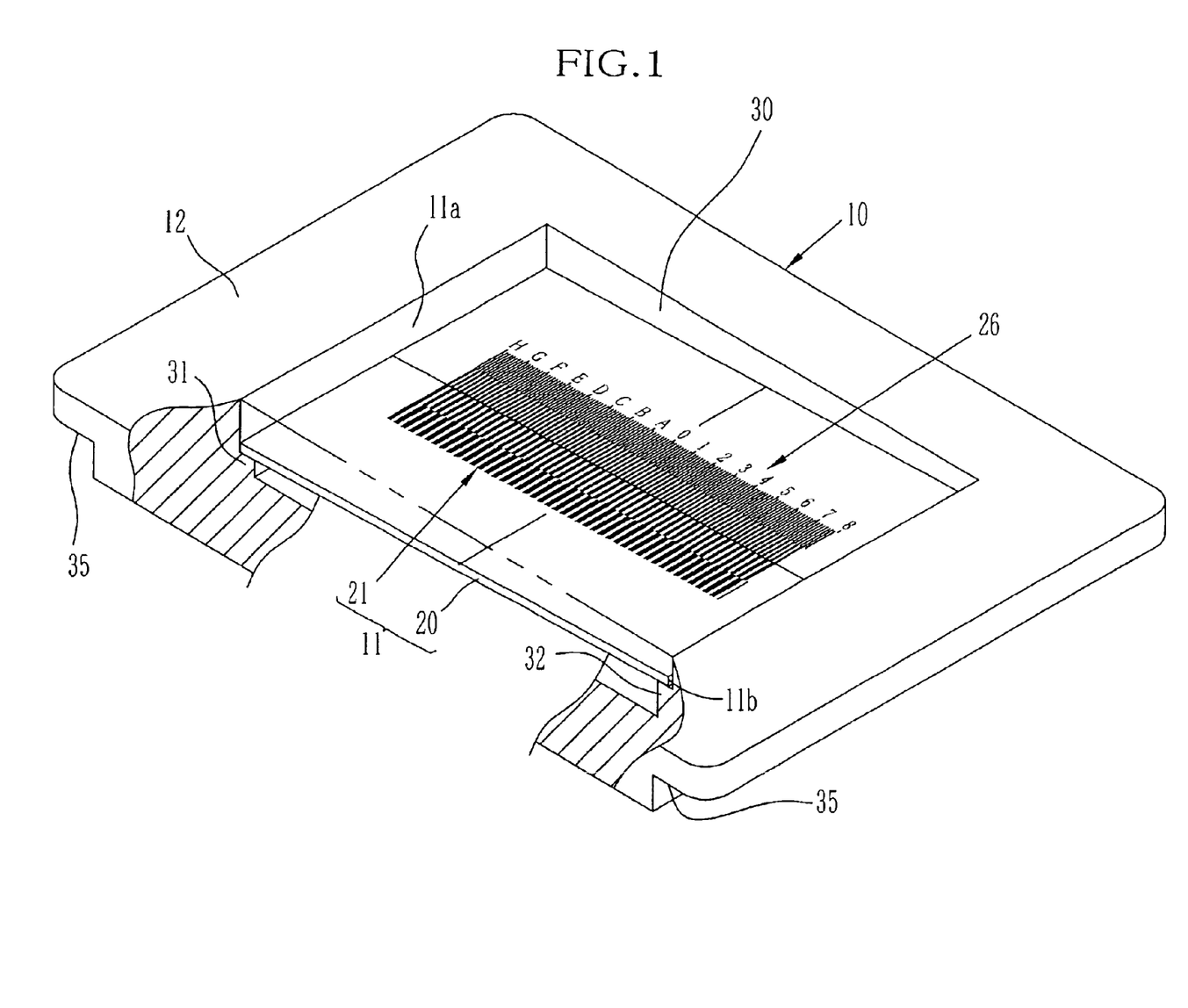
FIG. 1 shows a perspective view of a focus inspection device according to an embodiment of the present invention.
Figure 2:
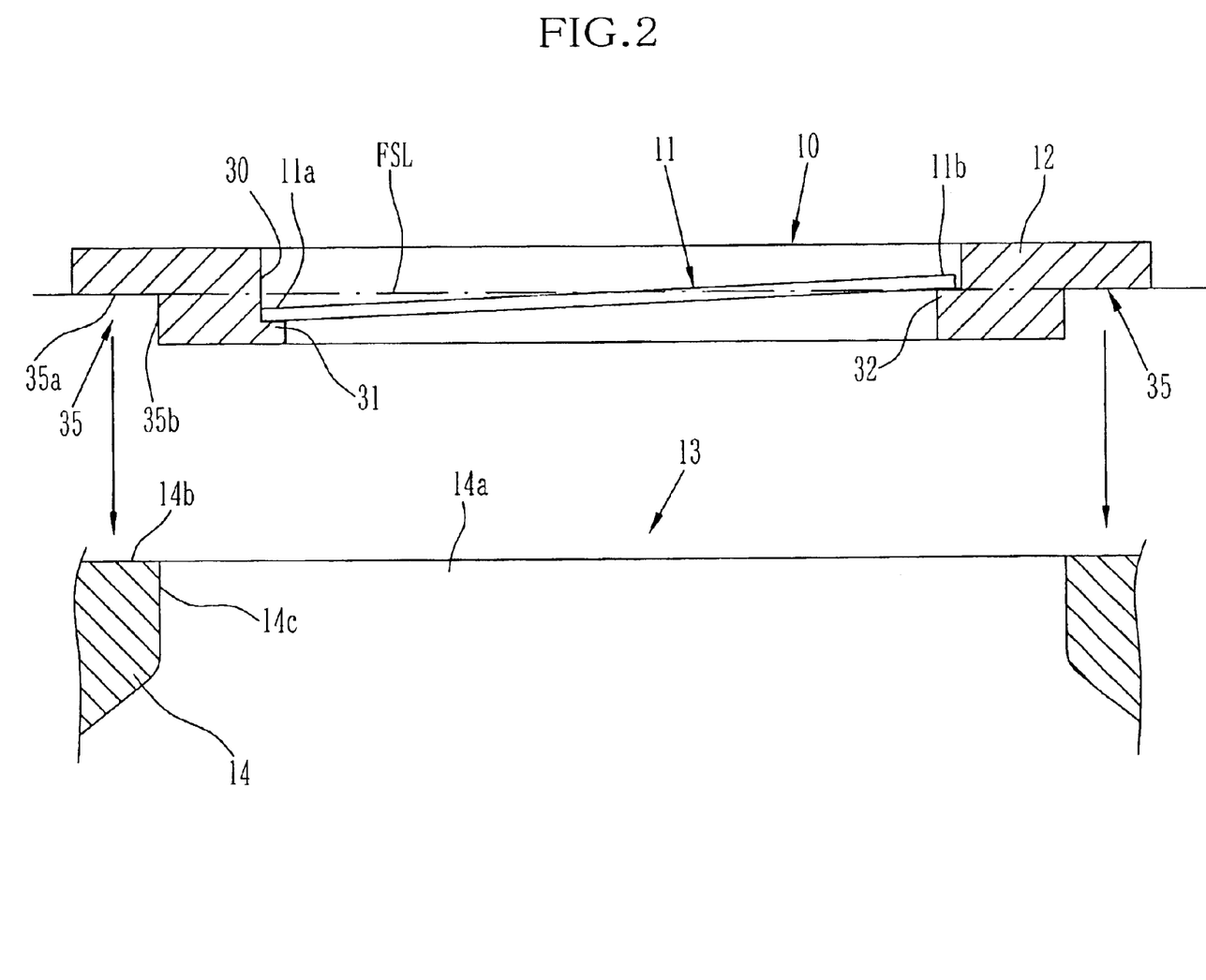
FIG. 2 shows a vertical section of the focus inspection device in connection to a lower mask of a film carrier of a printer.

A focus inspection device 10 shown in FIG. 1 is constituted of a focusing chart 11 and a holder 12 for holding the focusing chart 11. As shown in FIG. 2, the focus inspection device 10 is placed in an opening 14a of a lower mask 14 of a film carrier 13.

The focusing chart 11 is constituted of a glass plate 20 and a test pattern 21 consisting of parallel lines that extend in parallel to a widthwise direction of the focusing chart 11, and are formed on an obverse surface of the glass plate 20 by aluminum deposition. As shown in detail in FIG. 3, the test pattern 21 is constituted of first to fourth rows 22, 23, 24 and 25 of parallel lines, wherein each row extends in a lengthwise direction of the focusing chart 11 and is aligned with other rows in the widthwise direction of the focusing chart 11. The parallel lines of one row are arranged at a different interval from the parallel lines of another row. More specifically, each row consists of obscure or black parallel lines 22a, 23a, 24a or 25a, and transparent parallel lines 22b, 23b, 24b or 25b which are arranged alternately with the black parallel lines, wherein the parallel black lines and the transparent parallel lines of the same row have an equal width. That is, the line width of each row is equivalent to the spacing between the lines of that row, and the line width of one row is different from the line width of another row. In the present embodiment, the first row 22 in FIG. 3 has the smallest line spacing or the highest line density, and the fourth row 25 has the largest line spacing or the lowest line density.

Figure 3:
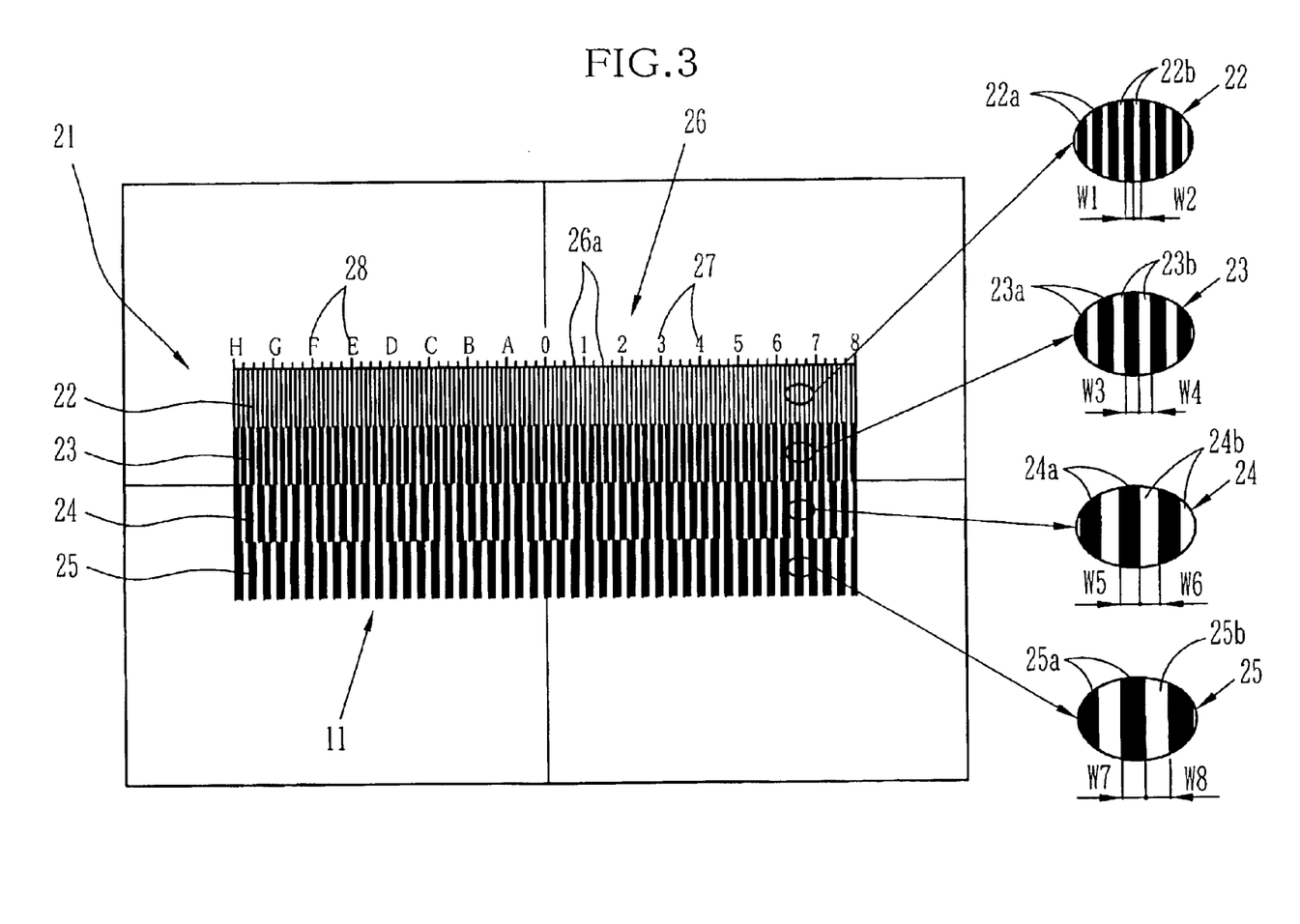
FIG. 3 shows a top plan view of a focusing chart of the focus inspection device.

For example, in the first row 22, the black lines 22a are arranged at a frequency of 40 lines/mm, and have a width W1 of 12.5 μm, so the transparent lines 22b have a width W2 of 12.5 μm. In the second row 23, the black lines 23a are arranged at a frequency of 25 lines/mm, and have a width W3 of 20 μm, so the transparent lines 23b have a width W4 of 20 μm. In the third row 24, the black lines 24a are arranged at a frequency of 16 lines/mm, and have a width W5 of 31.25 μm, so the transparent lines 24b have a width W6 of 31.25 μm. In the fourth row 25, the black lines 25a are arranged at a frequency of 12 lines/mm, and have a width W7 of 41.67 μm, so the transparent lines 25b have a width W8 of 41.67 μm.

Provided along a top margin of the test pattern 21 is a scale 26 that represents a degree of inclination of the focusing chart 11. As shown in FIG. 1, the holder 12 is shaped into a rectangular frame having a rectangular center opening 30 for holding the focusing chart 11 therein. A pair of steps 31 and 32 are formed in the margin of the opening 30 along opposite short sides thereof, such that short sides 11a and 11b of the focusing chart 11 are held on the steps 31 and 32 when the focusing chart 11 is put in the opening 30. The steps 31 and 32 have a difference in height from each other, as shown in FIG. 2, so the focusing chart 11 is inclined in its lengthwise direction, i.e. the direction along which the scale 26 is provided, as it is held in the holder 12. Thereafter, the focusing chart 11 is affixed to the holder 12 by an adhesive agent or another fastening device. The inclination of the focusing chart 11 in the holder 12 is determined such that the difference in height from the lower end to the upper end of the test pattern 21 is 1.6 mm. That is, the scale 26 is determined to indicate the height difference of ±0.8 mm from the center of the test pattern 21 to the opposite ends.

The center of the test pattern 21 is indicated by a number "0" in the scale 26, and the scale 26 is provided with numbers "1" to "8" at regular intervals along the upper half of the test pattern 21 to show a height difference of 0.1 mm each. On the other hand, the scale 26 is provided with alphabets "A" to "H" at regular intervals along the lower half of the test pattern 21 to show the height difference of 0.1 mm each. Between these numbers "1" to "8" and the alphabets "A" to "H", the scale 26 is graduated in 25 μm divisions 26a. It is alternatively possible to provide numbers "−1" to "−8" instead of the alphabet "A" to "H".

The holder 12 also has stepped flanges 35 along its short sides. Horizontal portions 35a of the stepped flanges 35 are placed on a top side 14b of a lower mask 14 of the film carrier 13, and vertical portions 35b of the stepped flanges 35 are fitted in the opening 14a of the lower mask 14 such that the vertical portions 35b are in contact with a vertical inner wall 14c around the opening 14a. Thereby the position of the focus inspection device 10 is fixed in the film carrier 13 in the horizontal and vertical directions. Where the focus inspection device 10 is positioned in the film carrier 13, the centers of the respective rows 22 to 25, i.e. the center of the test pattern 21 as indicated by the number "0" in the scale 26, coincide with a reference focal plane FSL in which a photo filmstrip is to be positioned flat in the film carrier 13. It is to be noted that stepped flanges like the stepped flanges 35 may be provided along the long sides of the holder 12, or around the four sides of the holder 12.

Figure 4:
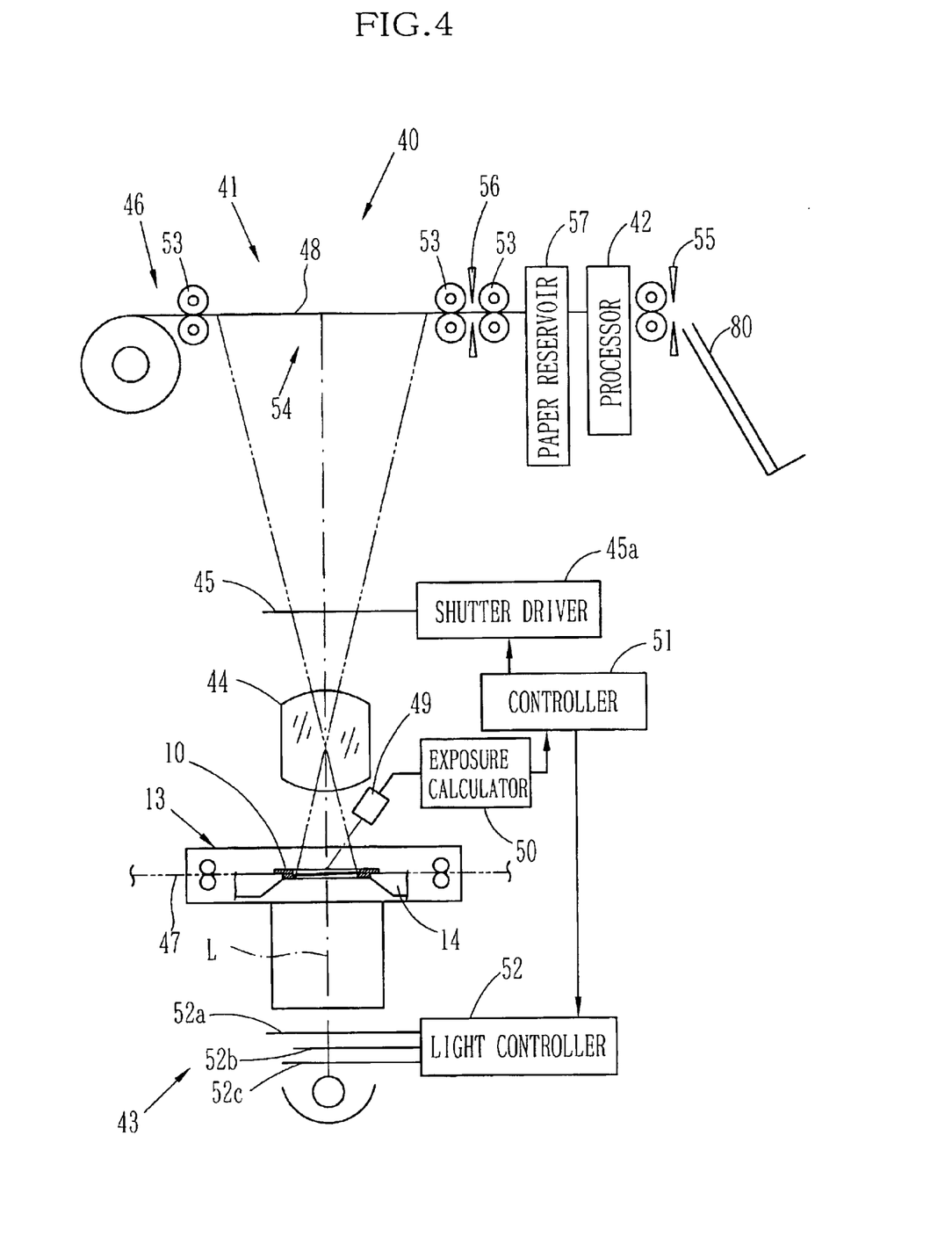
FIG. 4 schematically shows a printer-processor using the focus inspection device for adjusting the focus of a printing lens thereof.

FIG. 4 shows a printer-processor 40 that uses the focus inspection device 10 for adjusting the focus of a printing lens 44. The printer-processor 40 consists of a printer section 41 and a processor section 42. In the printer section 41, a light source 43, the film carrier 13, the printing lens 44, a black shutter 45 and a paper advancing device 46 are disposed in this order from a bottom side. The black shutter 45 is driven by a shutter driver 45a.

A photographic filmstrip 47 is carried through the film carrier 13, such that picture frames to print are seriatim placed in a printing station that is defined by the opening 14a of the lower mask 14. The picture frame placed in the printing station is illuminated by the light source 43, and light components traveling through the picture frame are projected as an optical image through the printing lens 44 onto a color photographic paper 48, recording a latent image on the photographic paper 48. Prior to exposing the photographic paper 48 to the optical image by opening the black shutter 45, a scanner 49 measures three-color separated photometric values of the picture frame in the printing station, and an exposure calculator 50 determines a proper exposure value on the basis of the three-color separated photometric values. Then, a controller 51 controls color balance and light intensity of the illumination light from the light source 43 by adjusting degree of insertion of three color filters 52a, 52b and 52c of a light quality control device 52 into a light path from the light source 43 to the printing station.

In the paper advancing section 46, the color photographic paper 48 is pulled out from a roll and is placed in an exposure position 54 through feed rollers 53. After being exposed, the color photographic paper 48 is fed to the processor section 42, to be subjected to ordinary photofinishing processes to develop the latent image into a visible positive image. Thereafter, the color photographic paper 48 is cut into an individual photo-print piece. A cutter 56 and a paper reservoir 57 are disposed between the printer section 41 and the processor section 42. The cutter 56 cuts the color photographic paper 48 when the printing process is interrupted or when a test printing process is executed. The paper reservoir 57 absorbs difference in advancing or processing speed of the color photographic paper 48 between the printer section 41 and the processor section 42.

Figure 5:
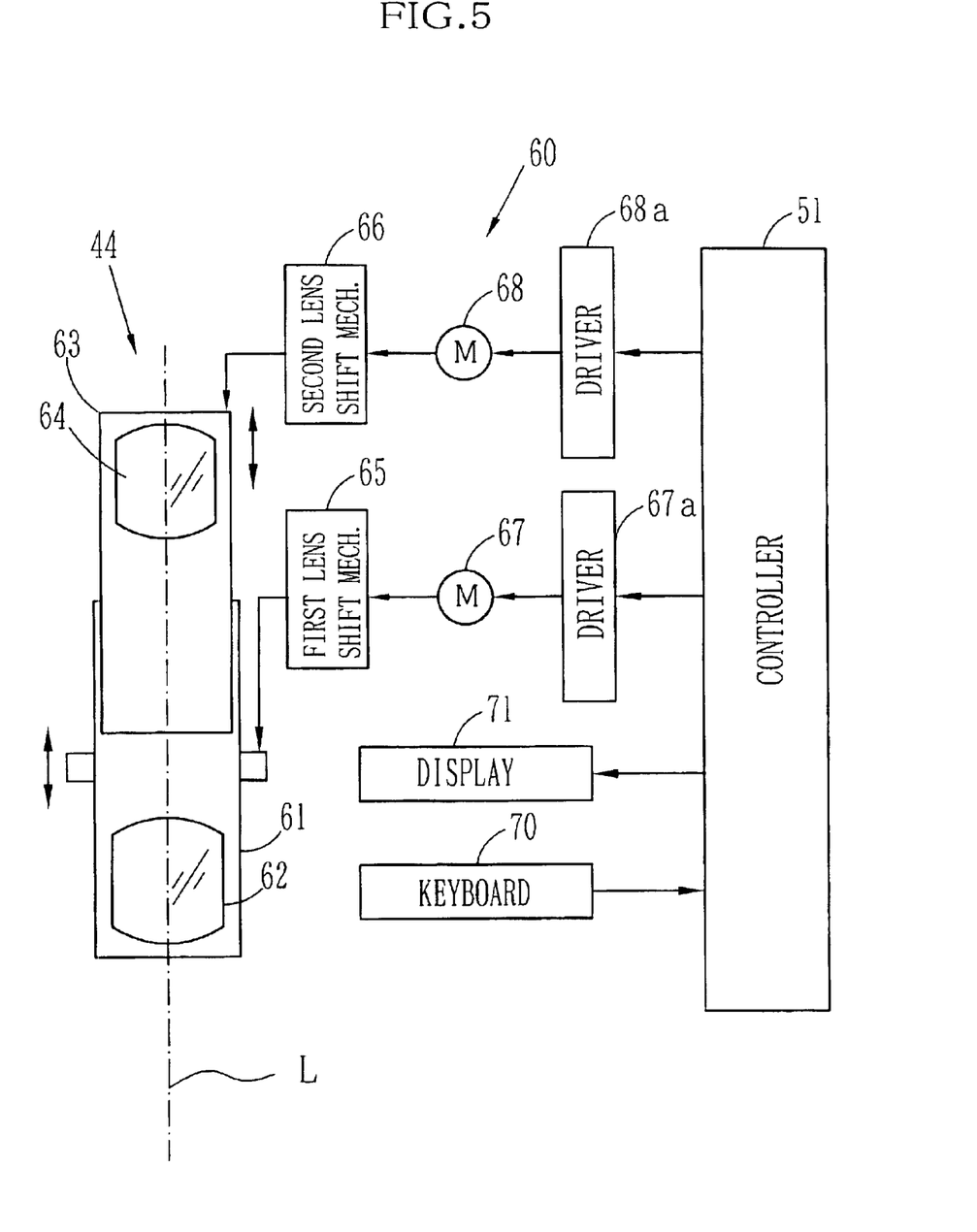
FIG. 5 shows a block diagram illustrating a focusing device of the printing lens of the printer-processor.

For inspecting and adjusting the focus of the printing lens 44, the focusing chart 11 is placed in the printing position instead of the photographic filmstrip 47. As shown in FIG. 5, a focusing device 60 is connected to the printing lens 44, and is controlled by the controller 51. The printing lens 44 is composed of a first lens group 62 fixedly held in a first lens barrel 61, and a second lens group 64 held in a second lens barrel 63 that is mounted in the first lens barrel 61 and movable relative to the first lens barrel 61. The first lens barrel 61 is moved along an optical axis L of the printing lens 44 by means of a first lens shift mechanism 65, and the second lens barrel 64 is also moved along the optical axis L by means of a second lens shift mechanism 66. The first and second lens shift mechanisms 65 and 66 are driven by respective pulse motors 67 and 68 which are controlled by the controller 51 through respective drivers 67a and 68a.

In the present embodiment, the focal plane of the printing lens 44 is displaced about 20 $\mu$m in the direction of the optical axis L per one drive pulse applied to the pulse motor 67 of the first lens shift mechanism 65 at any magnifications. On the other hand, by rotating the pulse motor 68 for the second lens shift mechanism 66, the second lens barrel 63 is moved relative to the first lens barrel 61, so the position of the second lens group 64 relative to the first lens group 62 changes. With a change in the position of the second lens group 64, the focal plane of the printing lens 44 may also be displaced in the direction of the optical axis L. Therefore, the focus of the printing lens 44 is adjusted by controlling the number of drive pulses applied to the pulse motor 67 and the number of drive pulses applied to the second pulse motor 68 as well.

Now the method of inspecting and adjusting the focus of the printing lens 44 by means of the focus inspection device 10 will be described.

First the focus inspection device 10 is placed in the opening 14a of the lower mask 14 of the film carrier 13, so that the center of the test pattern 21 as indicated by "0" of the scale 26 is aligned with the reference focal plane FSL that is equivalent to a photosensitive surface of the photographic filmstrip 47 in the printing position, and the lengthwise direction of the focusing chart 11 is adjusted to the lengthwise direction of each picture frame in the printing position.

Then, a first lens set value "$\alpha$" and a second lens set value "$\beta$" are entered in the controller 51 through a keyboard 70, as reference values for controlling the first and second lens shift mechanisms 65 and 66 respectively. The entered lens set values are displayed on a screen of a display device 71. The lens set values $\alpha$ and $\beta$ are predetermined for each printing lens 44, and are recorded on the printing lens 44.

Figure 6:
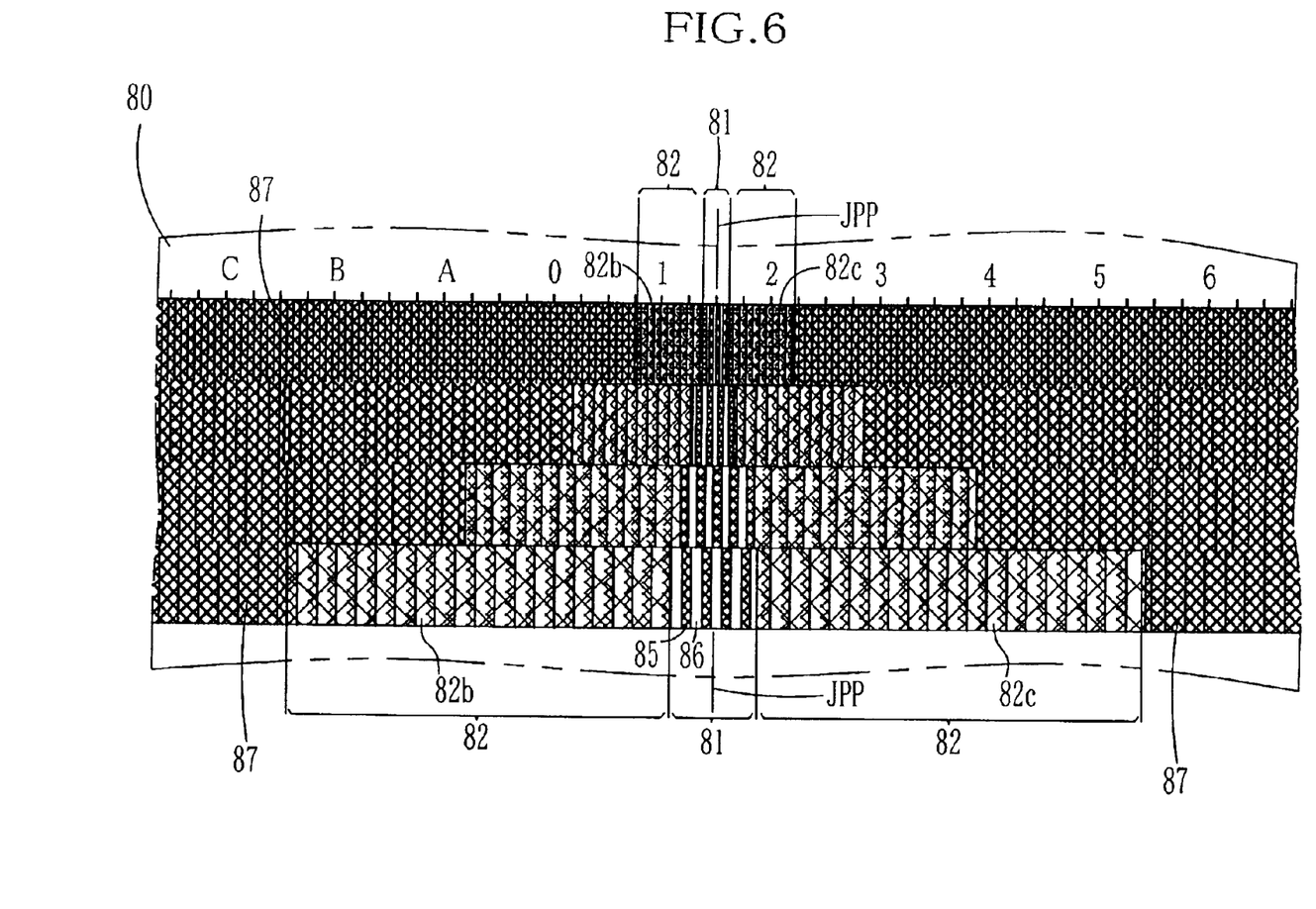
FIG. 6 shows an explanatory diagram illustrating a test print obtained from the focusing chart.

Next, printing conditions, including the print magnification, are set up. Initially, the print magnification is set at a minimum value, e.g. 3.96× in this instance, and an image of the focusing chart 11 is printed on the color photographic paper 48. Thereafter, an image of the focusing chart 11 is printed at a maximum magnification, e.g. 13.75×. By processing the color photographic paper 48 in the processor section 42, a couple of test prints are obtained. FIG. 6 shows a test print 80 as an example. In view of these test prints, a deviation of an object focal plane of the printing lens 44 from the reference focal plane FSL is detected in a manner as set forth below.

Since the focusing chart 11 of the focus inspection device 10 is inclined relative to the reference focal plane FSL that is perpendicular to the optical axis L of the printing lens 44, only those parallel lines of the test pattern 21 are reproduced sharply on the test print 80 which are placed proximate to the object focal plane of the printing 44 on the focusing chart 11. Hereinafter, the position of the test pattern 21 that is placed in the object focal plane of the printing lens 44 on the focusing chart 11 is called a just focus position JPP, and the position where the lines are most sharply reproduced may be determined as the just focus position JPP on the test print 80.

Concretely, on the test print 80, a just focus area 81 is produced around the just focus position JPP, where black and transparent parallel lines 85 and 86 are printed sharply, and blurred areas 82 containing blurred parallel lines are produced on opposite sides of the just focus area 81. Because the magnitude of blurs of the printed parallel lines increases with the distance from the just focus area 81, the density of the test print 80 increases with the distance from the just focus area 81. Thus, the test print 80 has high density areas 87 outside the blurred areas 82, wherein the black lines cannot be distinguished from each other.

In the example shown in FIG. 6, the just focus area 81 centers around an intermediate position between the grades "1" and "2" of the scale 26, and the blurred areas 82 extend substantially symmetrically about this intermediate position, so this position may be judged as the just focus position JPP that corresponds to the object focal plane of the printing lens 44. As described above, the parallel lines of the test pattern 21 are arranged at different intervals from one row to another such that the line spacing decreases from the fourth row 25 to the first row 22. Because the smaller line spacing means the higher line density, high density areas 87 get wider from the fourth row 25 to the first row 22 in the test print 80. That is, the just focus area 81 as a whole has a substantially triangular shape tapering toward the just focus position JPP. Since the scale 26 is provided along the top margin of the test pattern 21, it is easy to determine the just focus position JPP in the scale 26 on the test print 80 with naked eyes. In addition, because the blurred areas 82b and 82c also are converged toward the just focus position JPP on the opposite sides of the just focus area 81, the inspector can make use of the blurred areas 82b and 82c, to determine the just focus position JPP with accuracy.

Since the focusing chart 11 is inclined from the perpendicular plane to the optical axis L, the lines 85 and 86 in the left-hand blurred area 82b, which correspond to the parallel lines of the lower half of the test pattern 21, have a yellow-greenish tinge, whereas the lines 85 and 86 in the right-hand blurred area 82c, which correspond to the parallel lines of the upper half of the test pattern 21, have a tinge of blue. The lines 85 and 86 are seen to be black-white stripes only in the just focus area 81. Accordingly, the inspector can distinguish the just focus area 81 from the blurred areas 82a and 82b in view of the tinges, in addition to the sharpness of the lines 85 and 86. Which makes it easier for the inspector to determine the just focus position JPP.

If the focal plane of the printing lens 44 coincides with the reference focal plane FSL, the just focus position JPP would be located at the center of the test pattern 21 as indicated by "0" in the scale 26. If the focal plane of the printing lens 44 is higher than the reference focal plane FSL, the just focus position JPP deviates from the center of the test pattern 21 toward the upper end as indicated by "8" in the scale 26. If the focal plane of the printing lens 44 is lower than the reference focal plane FSL, the just focus position JPP deviates from the center of the test pattern 21 toward the lower end as indicated by "H" in the scale 26. The inspector reads the deviation of the just focus position JPP from the center position "0" on the scale 26, and inputs a value of the deviation in the controller 51 through the keyboard 70. Then, the controller 51 calculates a correction amount on the basis of the deviation value, for correcting the focal plane of the printing lens 44 to be coincident with the reference focal plane FSL. Formulas for the calculation of the correction amount are previously obtained on the basis of design values for the printing lens 44.

The method of correcting the focus of the printing lens 44 on the basis of the deviation value of the just focus position JPP will be described in more detail below.

In the present embodiment, the first lens set value $\alpha$ is represented by the number of drive pulses applied to the pulse motor 67, and the second lens set value $\beta$ is represented by the number of drive pulses applied to the pulse motor 68, each from a predetermined reference position of the printing lens 44. For example, the first lens set value $\alpha$ is "119", and the second lens set value $\beta$ is "105". On the assumption that a correcting direction to elongate the distance between the conjugate points of the printing lens 44 is regarded as a positive direction, the focal plane of the printing lens 44 is designed to be displaced +20 $\mu$m with a correction of +1 pulse to the first lens set value $\alpha$. On the other hand, with a correction of +1 pulse to the second lens set value $\beta$, the focal plane is designed to be displaced −86 $\mu$m at the magnification of 3.96×, unchanged at a magnification of 9.08×, and displaced +12 $\mu$m at the magnification of 13.75×.

Figure 7:
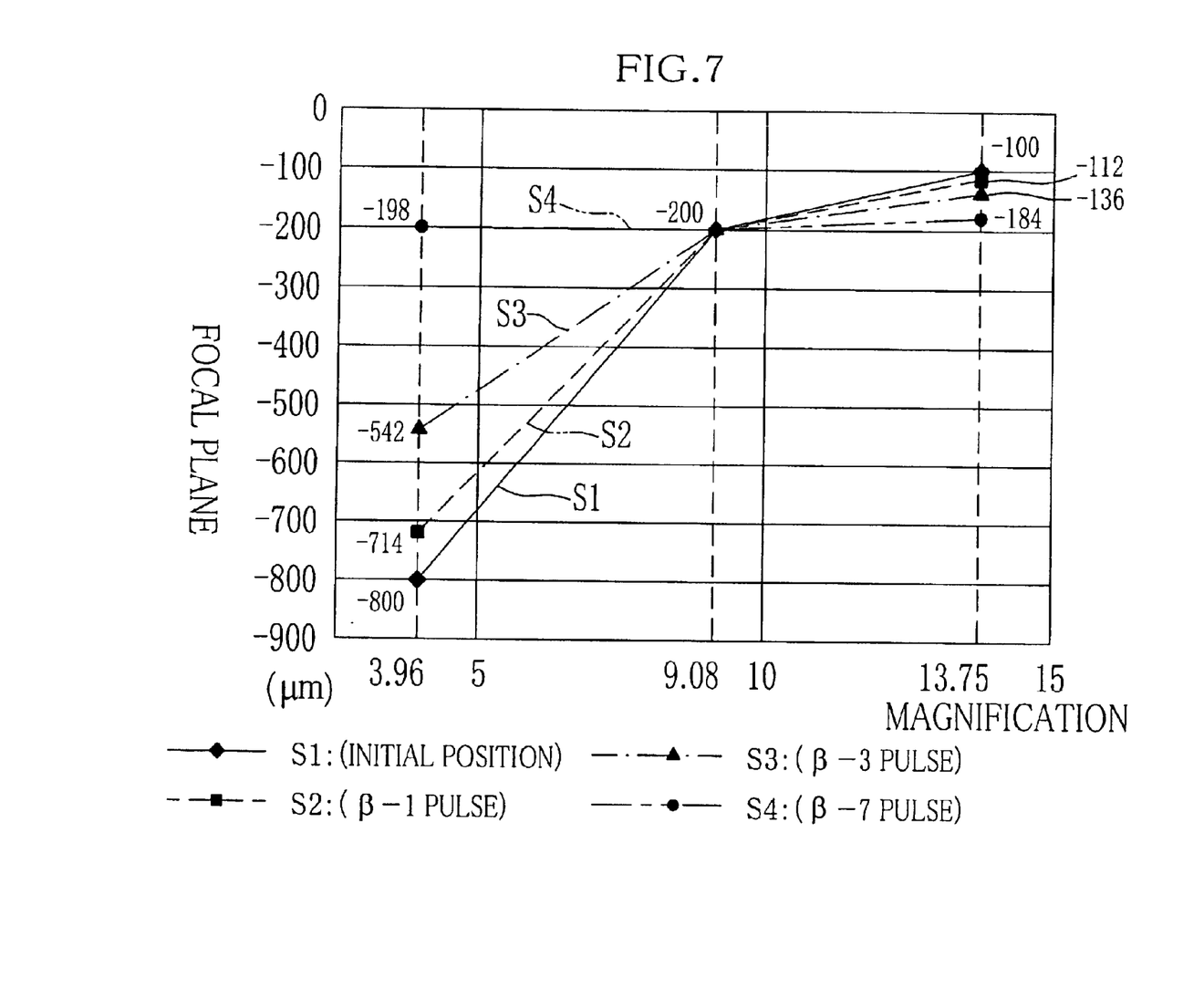
FIG. 7 shows a graph illustrating changes in position of the focal plane along the optical axis of the printing lens at different magnifications, caused by correcting a second lens set value β.
Figure 8:
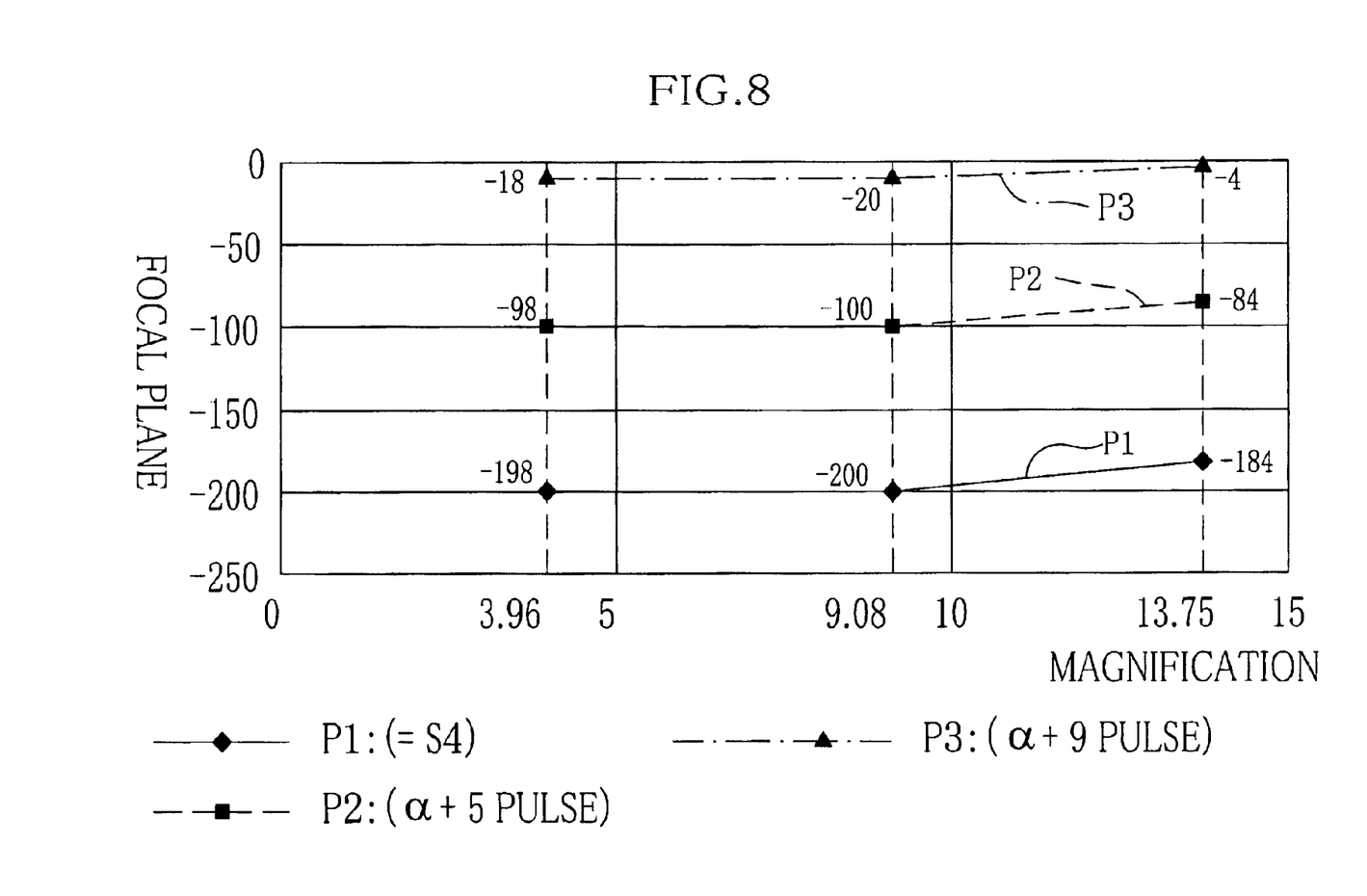
FIG. 8 shows a graph illustrating changes in position of the focal plane along the optical axis of the printing lens at different magnifications, caused by correcting a first lens set value α.

FIG. 7 shows how the focal plane of the printing lens 44 is displaced with the correction of the second lens set value $\beta$ at the respective magnifications "3.96×", "9.08×" and "13.75×". FIG. 8 shows how the focal plane of the printing lens 44 is displaced with the correction of the first lens set value $\alpha$ at the respective magnifications "3.96×", "9.08×" and "13.75×".

In FIG. 7, a curve S1 shown by a solid line represents initial positions of the focal plane of the printing lens 44 along the optical axis L at the respective magnifications, that is, where the first and second lens groups 62 and 64 are placed in those positions determined by the first and second lens set values $\alpha$ and $\beta$. On the other hand, a curve S2 shown by dashed line represents axial positions of the focal plane obtained by subtracting 1 from the second lens set value $\beta$, a curve S3 shown by dashed line represents axial positions of the focal plane obtained by subtracting 3 from the second lens set value $\beta$, and a curve S4 shown by dashed line represents axial positions of the focal plane obtained by subtracting 7 from the second lens set value $\beta$, respectively at the above three magnifications. As seen from the curve S4, the positions of the focal plane at the different magnifications approach to each other when the second lens set value $\beta$ is corrected by −7 pulses, in the example shown in FIG. 7.

In FIG. 8, a curve P1 shown by a solid line represents axial positions of the focal plane at the three different magnifications after the correction of −7 pulses to the second lens set value $\beta$, before correcting the first lens set value $\alpha$, and a curve P2 shown by dashed lines represents positions of the focal plane at the respective magnifications after correcting the first lens set value $\alpha$ with a correction value of +5 pulses. That is, the curve P1 is equivalent to the curve S4. It is to be noted that the grade "0" in the vertical axis of the graphs of FIGS. 7 and 8 means that the focal plane coincides with the reference focal plane FSL. The first lens set value $\alpha$ should be corrected such that the focal plane approaches to the reference focal plane FSL at any magnifications. In this example, the focal plane approximates to the reference focal plane at any magnifications by correcting the first lens set value $\alpha$ with a correction value of +9 pulses, as shown by a curve P3 in FIG. 8.

From the characteristic curves shown in FIGS. 7 and 8, it is proved that a correction value $\Delta\alpha$ for the first lens set value $\alpha$ and a correction value $\Delta\beta$ for the second lens set value $\beta$ may be calculated on the basis of a deviation value X of the just focus position JPP from the center of the scale 26 at a minimum magnification, and a deviation value Y of the just focus position JPP from the center of the scale 26 at a maximum magnification, wherein these deviation values X and Y may be determined by the visual inspection on the test prints obtained at the minimum and maximum magnifications respectively.

Concretely, the correction value $\Delta\beta$ for the second lens set value $\beta$ is calculated by use of the following equation:

$$\Delta\beta = (X-Y)/(\beta2-\beta1)$$

wherein $\beta1$ represents a change in the axial position of the focal plane per one pulse added to the second lens set value $\beta$ at the minimum magnification, and $\beta2$ represents a change in the axial position of the focal plane per one pulse added to the second lens set value $\beta$ at the maximum magnification.

The correction value $\Delta\alpha$ is calculated by use of the following equation:

$$\Delta\alpha = -(Y + 12 \cdot \Delta\beta)/\alpha1$$

wherein $\alpha1$ represents a change in the axial position of the focal plane per one pulse of increment in the first lens set value $\alpha$.

In the present embodiment, as shown in FIGS. 7 and 8, $\beta1$ is −86 $\mu$m, $\beta2$ is 12 $\mu$m, X is −800 $\mu$m, and Y is −100 $\mu$m, wherein the minimum magnification is 3.96×, and the maximum magnification is 13.75×. Thus the correction value $\Delta\beta$ is:

$$\Delta\beta = \{(-800)-(-100)\}/\{12-(-86)\} = -700/98 = -7.14$$

Since $\alpha 1$ is 20 μm in this embodiment, $$\Delta\beta = -\{(-100)+12\cdot(-7.14)\}/20 = 9.28$$

According to these correction values $\Delta\alpha=9.28$ and $\Delta\beta=-7.14$, the first lens group 62 is displaced from the initial position by 9 drive pulses in the positive direction, i.e. the direction to elongate the conjugate distance, and the second lens group 64 is displaced from the initial position by 7 drive pulses in the negative direction, wherein the initial positions of the first and second lens groups 62 and 64 are determined by the first lens set value $\alpha$ and the second lens set value $\beta$ respectively.

After correcting the focus of the printing lens 44 with the calculated correction values $\Delta\alpha$ and $\Delta\beta$, test prints are made from the focusing chart 11 not only at the minimum and maximum magnifications of 3.96× and 13.75×, but also at an intermediate magnification, i.e. 9.08×. Then the just focus position is determined with respect to each of the three test prints in the same way as set forth above.

If the deviation of the just focus position from the center position of the scale 26 is not within a tolerance at the minimum magnification or at the maximum magnification, the correction values $\Delta\alpha$ and $\Delta\beta$ are recalculated on the basis of the newly determined deviation values X and Y on the test prints obtained at the minimum and maximum magnifications. After correcting the focus with the newly calculated correction values $\Delta\alpha$ and $\Delta\beta$, test prints are made from the focusing chart 11 at the minimum, intermediate and maximum magnifications, and the just focus positions on the test prints are inspected. In this way, the focus of the printing lens 44 is adjusted to the optimum condition.

In the present embodiment, tolerances at the minimum, intermediate and maximum magnifications are predetermined as set forth below:

±50 μm at 3.96×

±25 μm at 9.08×

±25 μm at 13.75×

In addition to these tolerance ranges, a tolerance of 25 μm is required on the difference in height between the focal plane or the just focus position at the magnification of 9.08× and that at the magnification of 13.75×. However, the tolerances may be set at other approximate values.

Although the lens set values are automatically corrected with correction values which are determined on the basis of the deviation values detected from the test prints and entered in the controller in the present embodiment, it is possible to manually calculate correction values from the deviation values, revise the lens set values with the correction values and input revised lens set values through the keyboard.

In the above embodiment, the lengthwise direction of the focusing chart 11 is aligned with the lengthwise direction of the picture frame in the printing station, it is possible to inspect the focus of the printing lens in another condition where the focusing chart 11 is turned by 90 degrees from this position.

Figure 9:
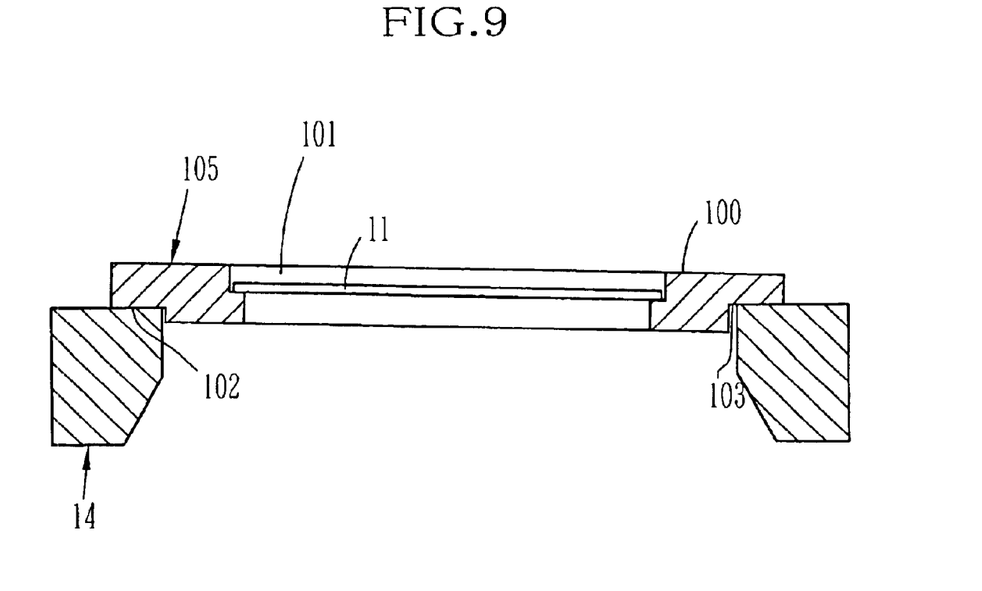
FIG. 9 shows a vertical section of a focus inspection device according to another embodiment of the invention, in connection to the lower mask of the film carrier.

Although the focusing chart 11 is held inclined in the opening 30 of the holder 12 in the focus inspection device 10 of the above embodiment, it is alternatively possible to hold the focusing chart 11 horizontal in an opening of a holder with respect to a flat top surface of the holder, and provide the inclination of the focusing chart 11 by other means. According to an embodiment of a focus inspection device 105 shown in FIG. 9, the focusing chart 11 is held horizontal in an opening 101 of a holder 100 with respect to a flat top surface of the holder 100, and bottom stepped portions 102 and 103 of the holder 100 have different heights from each other relative to a top flat surface of the holder 100. Thus, the focusing chart 11 is inclined to the perpendicular plane to the optical axis L of the printing lens 44 when the focus inspection device 105 is fitted in the opening 14a of the lower mask 14 of the film carrier 13 with the bottom stepped portions 102 and 103 in contact with the top surface of the lower mask 14.

Figure 10:
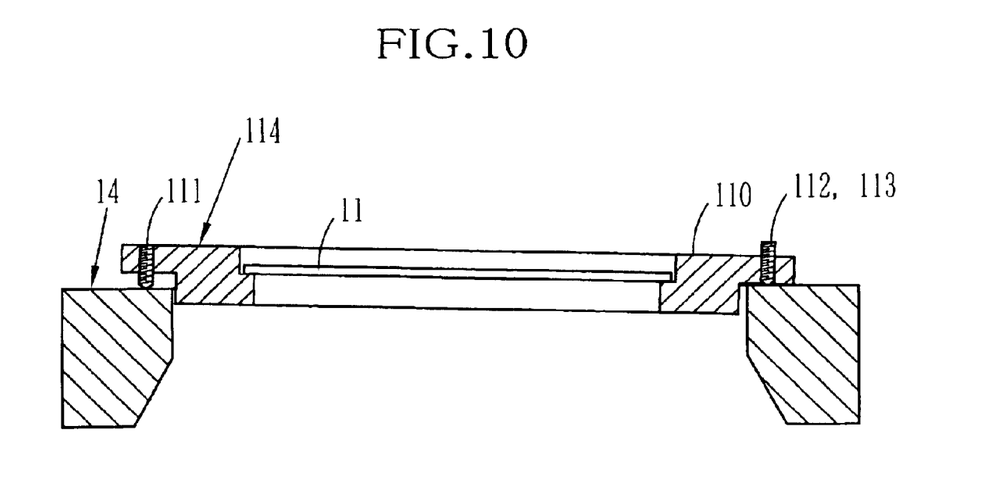
FIG. 10 shows a vertical section of a focus inspection device according to a further embodiment of the invention, in connection to the lower mask of the film carrier.
Figure 11:
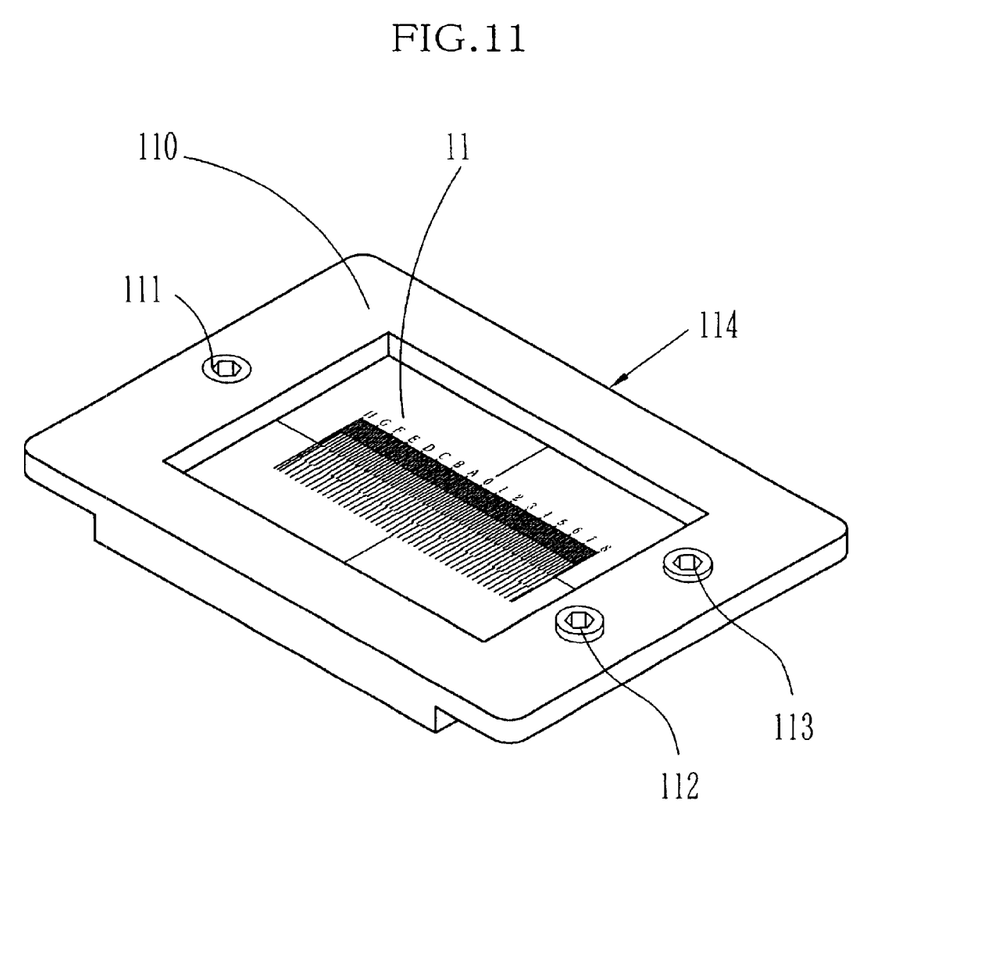
FIG. 11 shows a perspective view of the focus inspection device of FIG. 10.

Instead of providing a difference in height between the stepped portions 102 and 103, it is possible to provide a focus inspection device with an inclination adjusting device. According to an embodiment shown in FIGS. 10 and 11, the inclination adjusting device is constituted of three screws 111, 112 and 113 put through opposite ends of a holder 110 of a focus inspection device 114 wherein the focusing chart 11 is held horizontal to a top flat surface of the holder 110. By turning one or more of the screws 111 to 113, the height of the top surface of the holder and thus the height of the focusing chart 11 are varied relative to the lower mask 14, so is adjusted the inclination of the focusing chart 11. It is preferable to use the screw 111 for adjusting the inclination, and the screws 112 and 113 on the opposite end for adjusting the center of the focusing chart 11 to the reference focal plane FSL (see FIG. 2).

It is also possible to provide a device for setting the focusing chart 11 inclined to the perpendicular plane to the optical axis in the film carrier, e.g. on the lower mask, instead of the holder 12, 100 or 110 of the focusing chart 11. Such a device may be constituted of a pair of stepped portions having different heights, or positioning screws, or spacers disposed between the lower mask and the focus inspection device, or the like.

Furthermore, it is possible to provide the inclination adjusting device in the focus inspection device 10 where the focusing chart 11 is held inclined relative to the holder 12, for the sake of fine-adjustment of the inclination of the focusing chart 11. It is also possible to hold the focusing chart 11 to be adjustable in inclination relative to the holder by means of screws or the like.

Although the just focus position JPP is determined by the inspector inspecting the test prints with naked eyes, it is possible to measure a mean density in each of several divisions of each row 22, 23, 24 or 25 of the test pattern 21 on the test print, to determine the just focus position JPP based on the measured densities. In that case, the divisions of one row should have the same length in the lengthwise direction of the pattern 21, and the length of the division is preferably a multiple of the line spacing or line width of that row, so that each division consists of the same number of parallel lines of that row. Thus, if the density of one row were uniform on the test print, the densities of the divisions of that row would be equal to each other. Since the density of the test print becomes the lowest around the just focus position JPP, as set forth above with reference to FIG. 6, it is possible to regard the division with the lowest density as the just focus position. The mean density of each division may be determined by calculation, or by means of a line sensor having a low pixel density, or an area sensor having a low pixel density.

Since each division consists of the same number of parallel lines within a row and the parallel lines are arranged in the same frequency within a row, it is preferable to measure a mean density of each division after shifting the position of each division by a half interval, and detect a difference between the mean density of the division before the shift and that after the shift. Because the difference in density is larger in the just focus position than in the blurred area, it is possible to determine the just focus position more precisely. Integrating the density values at half cycles and comparing the integration results will lead to the more accurate determination of the just focus position.

Although the focusing chart 11 has the test pattern 21 consisting of the four rows having different line frequencies from each other in the above embodiment, the test pattern may have a single row of parallel lines, or two, three or more than four rows of lines. The line spacing is equal to the line width within each row in the above embodiment, it is possible to differentiate the line spacing from the line width. The opaque lines may have another color than black.

The materials for manufacturing the focusing chart 11 is not limited to the above embodiment. For example, a photographic film having the above test pattern recorded thereon may be used as a focusing chart.

Although the focusing chart used in the above embodiment is of a type that is illuminated from the opposite side to the printing lens, and has transparent lines between the opaque parallel lines, the present invention is applicable to a case where a reflective type focusing chart is used, whose test pattern consists of alternating black and white parallel lines. In that case, the reflective type focusing chart is placed on a printing station for a reflective original.

The test pattern is not limited to the above embodiment. The parallel lines may be slanted from the rectangular direction to the inclined direction along which the parallel lines are arranged side by side. It is possible to constitute the test pattern of other elements than the parallel lines. For example, it is possible to arrange dot patterns or a group of circles along an inclined direction of the focusing chart. In that case, the just focus position may be determined with ease just by inspecting the sharpness of the patterns on the test print in the same way as described above.

It is also possible to make a test print while placing the focusing chart in the reference focal plane without inclining it. Then, the focal condition may be inspected with respect to the entire area of the printed picture frame, to check if the reference focal plane deviates from its normal position, or inclines to the perpendicular plane to the optical axis of the printing lens.

Although the present invention has been described with respect to the focus inspection device for the printing lens, the present invention is applicable to any kinds of image forming lenses that require focusing, like an image forming lens of a scanner.

Thus, the present invention is not limited to the above embodiments but, on the contrary, various modifications will be possible to those skilled in the art without departing from the scope of claims appended hereto.

What is claimed is:

1. A focus inspection device for use in focusing a lens that is determined to form an optical image of an original on a predetermined image forming surface when the original is placed in a predetermined reference focal plane that is perpendicular to an optical axis of said lens, said focus inspection device comprising:
    a focusing chart having a test pattern thereon; and
    a holding device for holding said focusing chart in a position inclined to said reference focal plane, wherein a deviation of an object focal plane of said lens from said reference focal plane is detected in view of sharpness of said test pattern on an image formed from said focusing chart through said lens.

2. A focus inspection device as recited in claim 1, wherein said lens is a printing lens, and said image forming surface is a photosensitive surface of a photographic recording material.

3. A focus inspection device as recited in claim 1, wherein said holding device holds said focusing chart such that a center of said test pattern is aligned with said reference focal plane.

4. A focus inspection device as recited in claim 1, wherein said focusing chart further comprises a scale provided adjacent said test pattern along the inclined direction of said focusing chart, said scale serving as a measure of relative height of said inclined focusing chart to said reference focal plane.

5. A focus inspection device as recited in claim 1, wherein said test pattern comprises a plurality of lines extending in parallel to a transverse direction to the inclined direction of said focusing chart, said lines being equally spaced from each other in the inclined direction.

6. A focus inspection device as recited in claim 1, wherein said test pattern comprising a plurality of rows of lines extending in parallel to a transverse direction to the inclined direction of said focusing chart, said lines being equally spaced from each other in the inclined direction within each row, and the spacing between said lines increases sequentially from one row to another.

7. A focus inspection device as recited in claim 1, wherein said holding device comprising a holding frame that holds said focusing chart therein, and a device for positioning said holding frame in the optical axis of said lens such that said focusing chart is inclined to said reference focal plane with a center of said test pattern aligned with said reference focal plane.

8. A focus inspection device as recited in claim 7, further comprising an inclination adjusting device for adjusting the inclination of said focusing chart to said reference focal plane.

9. A focus inspection device as recited in claim 1, wherein said focusing chart is manufactured by depositing said test pattern on a glass plate.

10. The focus inspection device of claim 1, wherein said lens includes:
    a first lens group held in a first lens barrel,
    a second lens group held in a second lens barrel, and wherein
    said second lens barrel is mounted in the first lens barrel and is moveable relative to the first lens barrel.

11. The focus inspection device of claim 10, further including a scanner, shutter and exposure calculator, wherein
    said scanner measures said original image for three-color separated photometric values prior to said shutter opening, said shutter opening based upon said exposure calculator determining proper exposure values for the predetermined image forming surface derived from the three-color separated photometric values previously taken.

12. The focus inspection device of claim 11, further including a controller that controls color balance and light intensity by adjusting the degree of insertion of three color filters of a light quality control device into a light path of a light source.

13. A focusing method for a printing lens that is determined to print an image of an original on a photosensitive recording material placed in a predetermined position when the original is placed in a predetermined reference focal plane that is perpendicular to an optical axis of said lens, said method comprising the steps of:

holding a focusing chart with a test pattern thereon in a position where said focusing chart is inclined to said reference focal plane with a center of said test pattern aligned with said reference focal plane;

making at least a test print from said focusing chart through said printing lens;

detecting a deviation value of an object focal plane of said printing lens from said reference focal plane in view of sharpness of said test pattern reproduced on said test print; and adjusting the object focal plane of said printing lens to said reference focal plane in accordance with the detected deviation value of the object focal plane.

14. A focusing method as recited in claim 13, further comprising the step of calculating correction amounts from the detected deviation value of the object focal plane by use of predetermined calculation formulas.

15. A focusing method as recited in claim 13, wherein said test pattern comprises a plurality of parallel lines equally spaced from each other in a transverse direction to said lines, and said focusing chart is held inclined to said reference focal plane in the transverse direction to said parallel lines.

16. A focusing method as recited in claim 15, wherein a scale is provided adjacent said test pattern along the transverse direction to said parallel lines, said scale serving as a measure of relative height of said inclined focusing chart to said reference focal plane, for allowing to measure the deviation value of the object focal plane of said printing lens from said reference focal plane as a relative height from said reference focal plane by use of said scale reproduced on said test print.

17. A focusing method as recited in claim 16, wherein the sharpness of said test pattern are evaluated as density distribution on said test print, to detect the deviation value of the object focal plane of said printing lens as a deviation value of the lowest density area from the center of said test pattern on said test print.

18. A focusing method for a printing lens that is determined to print an image of an original on a photosensitive recording material placed in a predetermined position when the original is placed in a predetermined reference focal plane that is perpendicular to an optical axis of said lens, said method comprising the steps of:

holding a focusing chart with a test pattern thereon in a position where said focusing chart is inclined to said reference focal plane with a center of said test pattern aligned with said reference focal plane;

making test prints from said focusing chart through said printing lens while setting said printing lens at different printing magnifications;

detecting a deviation value of an object focal plane of said printing lens from said reference focal plane at each of said different printing magnifications in view of sharpness of said test pattern reproduced on said test prints;

calculating correction amounts from the deviation values detected from said test prints; and adjusting the object focal plane of said printing lens to said reference focal plane in accordance with the correction amounts.

19. A focusing method as recited in claim 18, wherein said test pattern comprises a plurality of parallel lines equally spaced from each other in a transverse direction to said lines, and said focusing chart is held inclined to said reference focal plane in the transverse direction to said parallel lines.

20. A focusing method as recited in claim 19, wherein a scale is provided adjacent said test pattern along the transverse direction to said parallel lines, said scale serving as a measure of relative height of said inclined focusing chart to said reference focal plane, for allowing to measure the deviation value of the object focal plane of said printing lens from said reference focal plane as a relative height from said reference focal plane by use of said scale reproduced on said test print.

21. A focusing method as recited in claim 20, wherein the sharpness of said test pattern are evaluated as density distribution on said test print, to detect the deviation value of the object focal plane of said printing lens as a deviation value of the lowest density area from the center of said test pattern on each of said test prints.

* * * * *